US012151722B2

(12) United States Patent
Mangou et al.

(10) Patent No.: US 12,151,722 B2
(45) Date of Patent: Nov. 26, 2024

(54) RAILWAY VEHICLE COMPARTMENT, ASSOCIATED ASSEMBLY, RAILWAY VEHICLE AND METHOD

(71) Applicant: SpeedInnov, Paris (FR)

(72) Inventors: Pierre Mangou, Niort (FR); Tatiana Yakubovich-Hugon, La Rochelle (FR)

(73) Assignee: SpeedInnov, Paris (FR)

( * ) Notice: Subject to any disclaimer, the term of this patent is extended or adjusted under 35 U.S.C. 154(b) by 831 days.

(21) Appl. No.: 17/320,542

(22) Filed: May 14, 2021

(65) Prior Publication Data

US 2021/0354736 A1 Nov. 18, 2021

(30) Foreign Application Priority Data

May 15, 2020 (EP) .................................... 20305502

(51) Int. Cl.

*B61K 13/04* (2006.01)
*B61D 19/00* (2006.01)
*B61D 19/02* (2006.01)
*B61K 13/00* (2006.01)
*B61D 17/04* (2006.01)
(Continued)

(52) U.S. Cl.

CPC .............. *B61K 13/04* (2013.01); *B61D 19/00* (2013.01); *B61D 19/026* (2013.01); *B61K 13/00* (2013.01); *B61D 17/048* (2013.01); *E05D 3/02* (2013.01); *E05D 5/0207* (2013.01); *E05D 5/043* (2013.01); *E05D 5/062* (2013.01); *E05D 7/083* (2013.01); *E05Y 2800/262* (2013.01); *E05Y 2800/358* (2013.01); *E05Y 2900/51* (2013.01); *E05Y 2900/538* (2013.01)

(58) Field of Classification Search

CPC ...... B61K 13/04; B61K 13/00; B61D 19/026; B61D 19/00; B61D 17/048; E05Y 2800/262; E05Y 2800/28; E05Y 2800/292; E05Y 2800/296; E05Y 2800/298; E05Y 2800/358; E05Y 2201/682; E05Y 2900/51; E05Y 2900/606; E05Y 2900/538; E05D 3/02; E05D 7/083; E05D 5/0207; E05D 5/043; E05D 5/062

USPC .................. 105/461, 354, 343, 49, 324, 321

See application file for complete search history.

(56) References Cited

U.S. PATENT DOCUMENTS 925,786 A * 6/1909 Pickles ............... E05D 15/1002 105/341
946,417 A * 1/1910 Winn ....................... B61D 1/08 105/324
1,013,376 A * 1/1912 Crewson ................ B61D 19/02 105/341

FOREIGN PATENT DOCUMENTS

CN 109178007 A * 1/2019 ............. B61D 49/00
DE 19910205 A1 * 9/1999 ............. B60N 2/015
(Continued)

*Primary Examiner* — Zachary L Kuhfuss
*Assistant Examiner* — James William Jones
(74) *Attorney, Agent, or Firm* — B. Aaron Schulman, Esq.; Stites & Harbison PLLC

(57) ABSTRACT

This compartment of a railway vehicle defines an interior volume and comprises:

- a cover movable between an open position, in which the cover is offset from the interior volume, and a closed position, in which the cover covers the interior volume and at least partially delimits that interior volume,
- a bar, a central region of the bar extending out of the interior volume, and
- a hinge defining the path of the cover between open and closed positions.

(Continued)

The cover is rotatable about an axis of the bar between its open and closed positions, the bar forming a pin of the hinge.

10 Claims, 3 Drawing Sheets

(51) Int. Cl.

| | |
|---|---|
| *E05D 3/02* | (2006.01) |
| *E05D 5/02* | (2006.01) |
| *E05D 5/04* | (2006.01) |
| *E05D 5/06* | (2006.01) |
| *E05D 7/083* | (2006.01) |

(56) References Cited

FOREIGN PATENT DOCUMENTS

| | | | | | |
|---|---|---|---|---|---|
| EP | 0938860 | A2 | * | 9/1999 | |
| EP | 1059230 | A2 | * | 12/2000 | ............... B60Q 3/43 |
| KR | 100625164 | B1 | * | 8/2005 | |
| WO | WO-0174224 | A1 | * | 10/2001 | ............... A47K 3/36 |
| WO | WO-2005064107 | A1 | * | 7/2005 | ............. B61D 19/02 |

* cited by examiner

RAILWAY VEHICLE COMPARTMENT, ASSOCIATED ASSEMBLY, RAILWAY VEHICLE AND METHOD

The present invention relates to a railway vehicle compartment of the type comprising:

- a cover movable between an open position, wherein the cover is offset from the interior volume, and a closed position, in which the cover covers the interior volume and at least partially delimits that interior volume,
- a bar, with a central region of the bar extending out of the interior volume, and
- a hinge defining the path of the cover between the open and closed positions.

The invention is particularly applicable to compartments located in rail vehicles and in particular compartments protecting door opening systems.

Compartments situated in railway vehicles are generally located in passenger areas. In such areas, it is necessary to ensure that passengers have a means of securing themselves in relation to the vehicle.

To this end, grab bars are provided in the vehicle in order to offer passengers a means of stabilizing themselves if necessary. Such grab bars are particularly useful near the vehicle doors, in order to facilitate entry or exit of the vehicle. However, the door mechanism is located near the doors in an area that may be suitable for the installation of grab bars.

Integrating a grab bar into compartment covers is already known, and in particular compartment covers comprising a door opening system in order to improve user comfort while protecting the door opening system.

However, such a railway vehicle compartment is complex to mount and difficult to open.

An aim of the invention is to provide a simplified and easy-to-open railway vehicle compartment.

To this end, it is an object of the invention to provide a railway vehicle compartment as stated, in which the cover is rotatable about an axis of the bar between its open and closed position, the bar forming a hinge of the hinge and in that, an upper region and a lower region of the bar extend into the interior volume, the bar passing through the cover between its lower region and its central region and between its upper region and its central region.

According other advantageous aspects of the invention, the rail vehicle compartment may comprise one or more of the following features, taken alone or in any technically possible combination:

- the bar is a grip bar intended for grasping by a passenger and supporting the weight of a rail vehicle user,
- the central region extends into a cavity of the cover and is offset from a cavity wall of the cover by at least 40 mm, and
- electrical equipment of the rail vehicle and in particular a door opening mechanism is arranged at least partially in the interior.

The invention further relates to an assembly comprising:

- a vehicle structural element, and
- a railway vehicle compartment as stated, the compartment comprising a lower support holding a lower end of the bar relative to the structural element of the vehicle and an upper support holding an upper end of the bar relative to the structural element of the vehicle, the hinge comprising a wing, the cover and the wing being integral.

According to other aspects of the invention, the assembly may comprise one or more of the following features, taken alone or in any technically possible combination:

- the lower support and the upper support form a hinge of the hinge and are adapted to keep the bar immovable relative to the structural element of the vehicle and wherein the cover is rotatable relative to the bar, and
- the upper end of the bar is screwed into the upper support, the lower support comprising:
  - a connection element attached to the structural element of the vehicle; and
  - a removable assembly, comprising:
    - a centering pin, adapted to be inserted into the connection element and to center the bar in the connection element, and
    - a locking member, adapted to be attached to the connection element and to block rotation of the bar about the axis,
- the bar being held stationary relative to the structural element when the centering pin is inserted and the locking member is secured.

The invention further relates to a rail vehicle comprising an assembly as stated.

The invention also relates to a method for mounting an assembly as stated, comprising the following steps:

- attaching the bar to the cover;
- attaching the connection element and the upper support to the structural element;
- screwing the bar equipped with the cover to the upper support;
- inserting the centering pin in the connection element;
- partially unscrewing the bar from the upper support, with the centering pin interacting with the connection element to center the bar in the connection element; and
- attaching the blocking member to the connection element to block rotation of the bar about the axis.

The invention will be better understood from the following description, given only as a non-limiting example and made with reference to the following figures, among which:

In the following description, a direct orthonormal basis (X, Y, Z) is considered. The elevation direction Z is defined according to the height of the vehicle and corresponds for example to the vertical direction when the vehicle is on a horizontal track. The longitudinal direction X corresponds to the front-rear direction of the vehicle and the transverse direction Y corresponds to the direction along the width of the vehicle.

The terms “upper” and “lower” as well as “high” and “low” are defined in relation to the elevation direction Z. The terms “left” and “right” are defined in relation to the transverse direction Y in the normal direction of travel of the vehicle.

Figure 1:
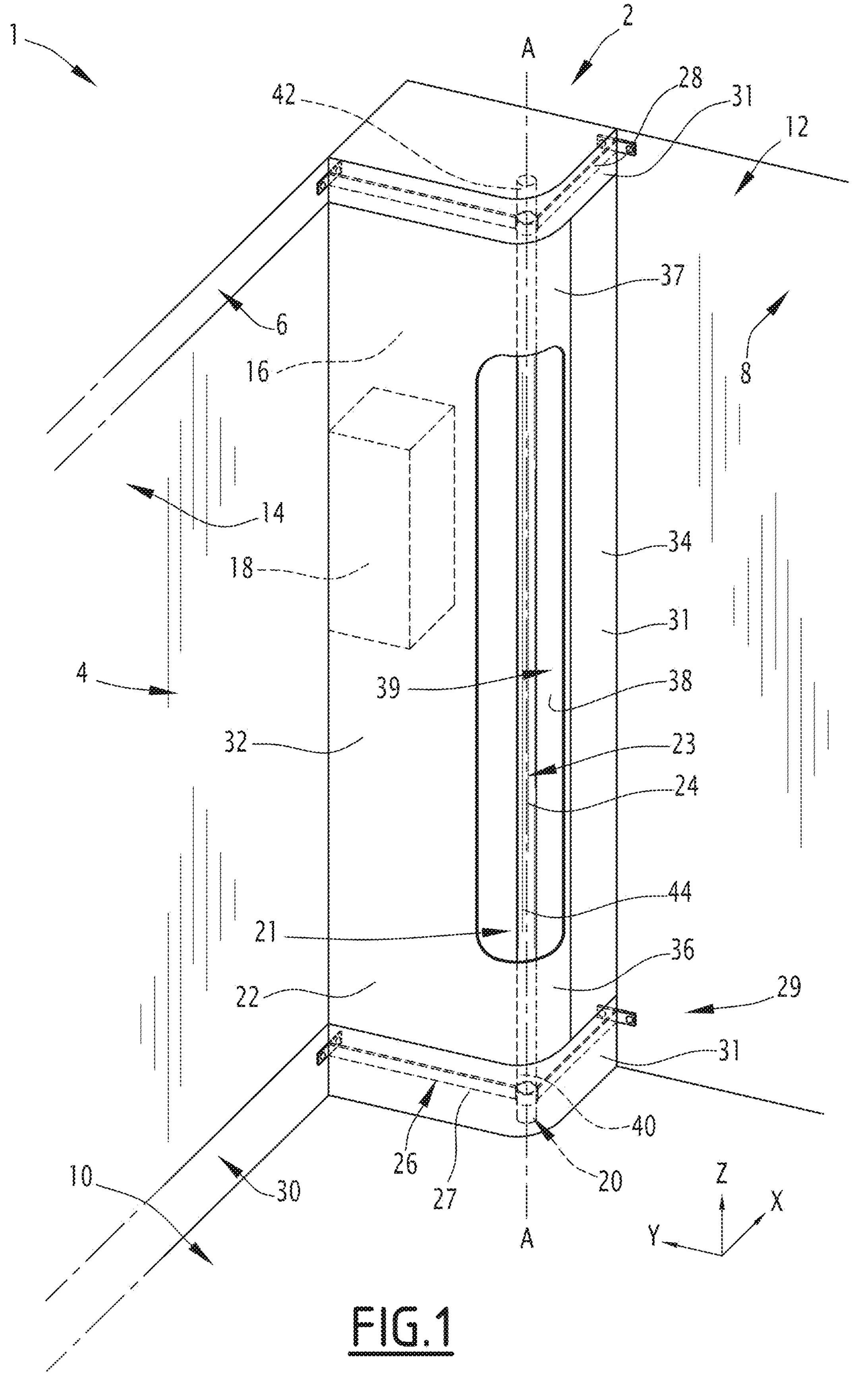
FIG. 1 is a schematic perspective representation of a railway vehicle compartment according to the invention.
Figure 2:
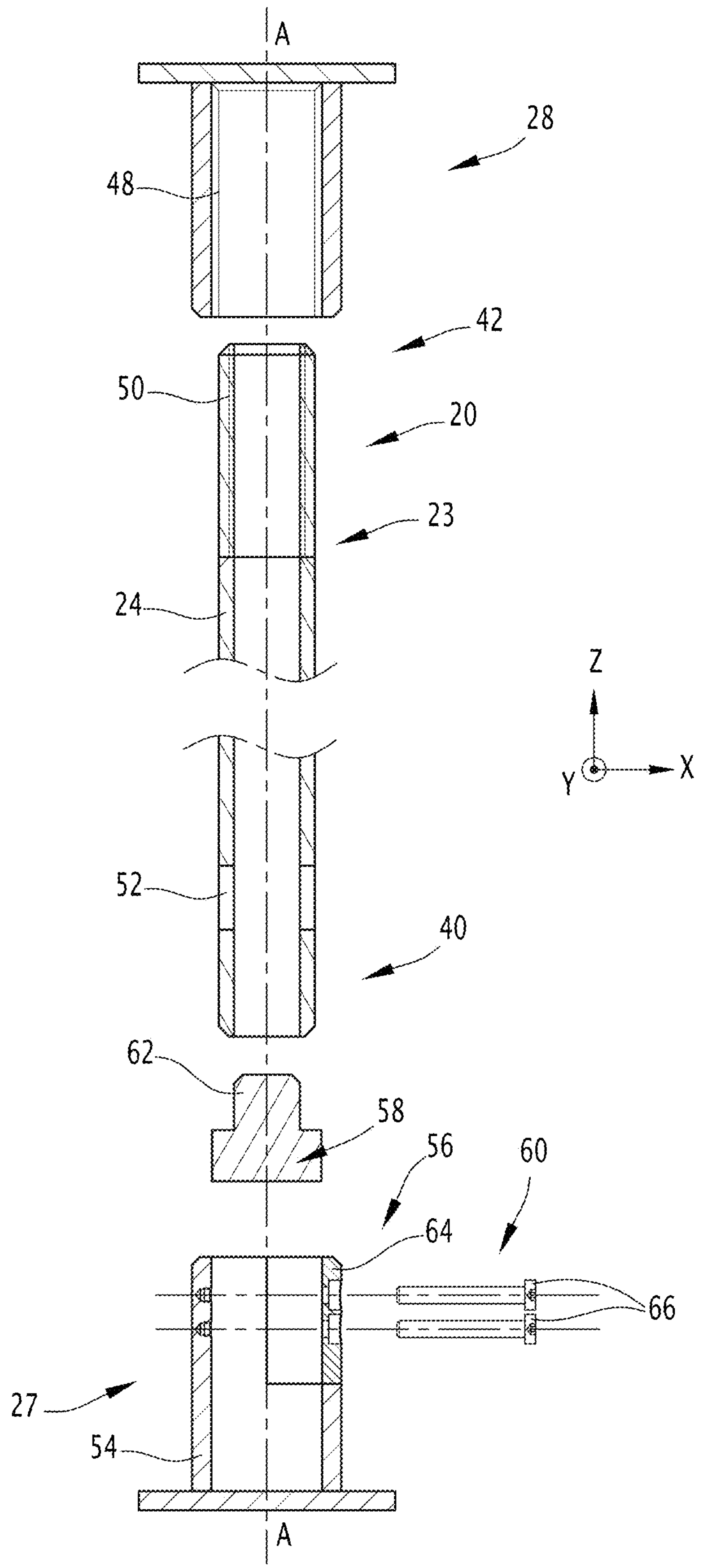
FIG. 2 is an exploded schematic cross-sectional representation along a plane passing through a longitudinal axis A-A of details of the compartment of FIG. 1.
Figure 3:
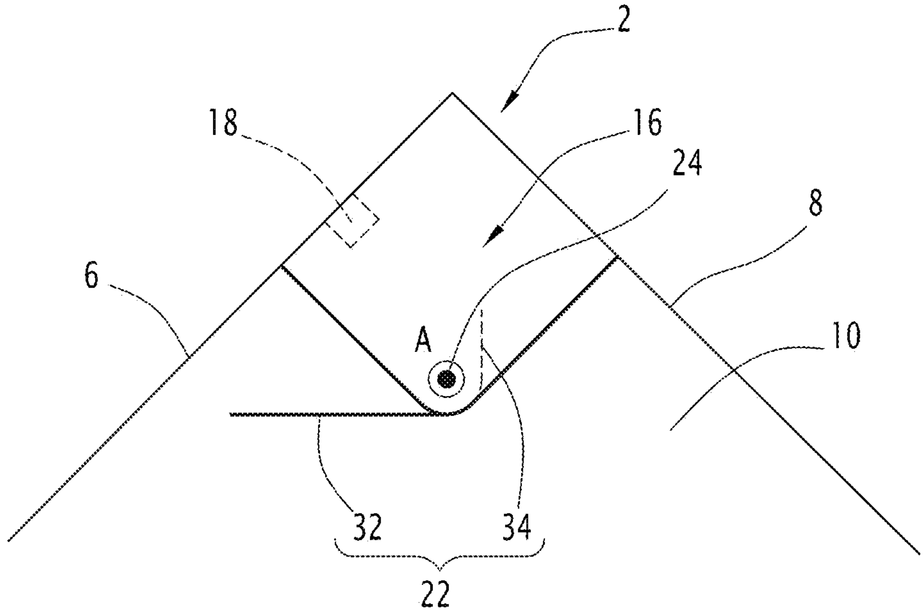
FIG. 3 is a top schematic view of the railway vehicle compartment according to the invention showing the cover being in the open position.

A rail vehicle 1 provided with a compartment 2 according to the invention is illustrated in FIG. 1. The rail vehicle is, for example, a railcar such as a tramway.

With reference to FIG. 1, the rail vehicle 1 comprises a passenger compartment 4 defined by a side wall 6, a transverse wall 8, a floor 10 and a ceiling 12. The side wall 6 extends for example longitudinally along one side of the rail vehicle 1 and comprises a door 14. The transverse wall 8 extends in a plane different from the plane formed by the side wall 6, in particular in a plane transverse to the longitudinal axis X of the rail vehicle 1. The side wall 6 and the transverse wall 8 extend between the floor 10 and the ceiling 12.

The compartment 2 defines an interior volume 16 in which electrical equipment of the rail vehicle, such as a door opening mechanism 18, is at least partially arranged. The door opening mechanism 18 is for example adapted to open and close the door 14 of the rail vehicle 1.

The compartment 2 comprises a hinge 20, the hinge 20 comprising a wing 21. The compartment 2 comprises a cover 22 attached to the wing 21. More particularly, the cover 22 forms the wing 21 of the hinge 20. The cover 22 is movable between an open position, in which the cover 22 is offset from the interior volume 16, and a closed position, in which the cover 22 covers the interior volume 16 and at least partially delimits the interior volume 16. The hinge 20 comprises a pin 23 formed by a bar 24 of a longitudinal axis A-A extending partially into the interior volume 16 and passing through the cover 22. The hinge comprises a knuckle 26 formed by a lower support 27 and an upper support 28, the knuckle 26 supporting the bar 24.

The compartment 2 comprises panels 31 fitted in the passenger compartment 4 of the vehicle 1 and defining the interior volume 16.

An assembly 29 comprises a structural element 30 of the vehicle and the compartment 2, the lower support 27 and the upper support 28 being attached to the structural element 30.

The cover 22 comprises a non-coplanar main panel 32 and secondary panel 34 connected by a lower curved region 36 and by an upper curved region 37. In a particular embodiment, the main panel 32 and the secondary panel 34 are perpendicular.

The cover 22 comprises a cavity wall 38 forming a cavity 39 extending between the main panel 32 and the secondary panel 34 and connecting the main panel 32 to the secondary panel 34. The cavity wall 38 extends between the lower curved region 36 and the upper curved region 37 and connects the lower curved region 36 to the upper curved region 37. The cavity 39 extends primarily along the longitudinal axis A-A.

The cover 22 is rotatable about the longitudinal axis A-A between the open position and the closed position. The hinge 20 defines the path of the cover 22 between the open position and the closed position.

The open position corresponds to the position of the cover 22 in which the cover 22 is offset from the interior volume 16 and in which the door opening mechanism 18 is accessible from outside the interior volume 16.

The closed position corresponds to the position of the cover 22 in which the cover 22 covers the interior volume 16 and in which the door opening mechanism 18 is inaccessible and hidden under the cover 22 and the panel assembly 31.

The cover 22 is for example molded in one piece.

The bar 24 extends between the floor 10 and the ceiling 12 in a substantially vertical direction.

The bar 24 is fixed immovable in translation in relation to the passenger compartment 4.

The bar 24 comprises a lower region 40 and an upper region 42 connected by a central region 44, the lower region 40, the upper region 42 and the central region 44 being continuous with each other.

The lower region 40 and the upper region 42 extend into the interior volume 16. Specifically, the lower region 40 extends into the recess formed by the lower curved region 36 and the upper region 42 extends into the recess formed by the upper curved region 37.

The central region 44 extends out of the interior volume 16. More particularly, the central region extends into the cavity 39.

The bar 24 extends through the cover 22 through the cavity wall 38, into a lower region of the cavity 39 and into an upper region of the cavity 39.

The bar 24 extends through the cover 22 between its lower region 40 and its central region 44 and between its upper region 42 and its central region 44. In other words, the central region 44 of the bar is the region extending between the lower region of the cavity 39 and the upper region of the cavity 39 where the bar passes through the cover 22.

The central region 44 of the bar 24 is offset from the cavity wall 38 by, for example, at least 40 mm. The person skilled in the art will understand here that a central portion of the central region 44 extends at least 40 mm from the cavity wall 38.

The length of the bar 24 is for example between 1 m and 3 m.

The diameter of the bar 24 is for example between 20 mm and 80 mm, preferably between 25 mm and 50 mm.

The bar 24 is for example a metal bar.

The bar 24 is a grip bar intended to be grasped by a user or to support the weight of a user. In particular, the bar 24 is adapted to support a user using the bar to maintain balance. In particular, the central region 44 is intended to be grasped by the passenger, with the offset between the central region and the cavity wall 38 being adapted to allow a users hand to pass through.

The bar 24 forms a pin of the hinge 20, the cover being rotatable about the longitudinal axis A-A of the bar 24.

The lower support 27 is attached to the vehicle structural element 30. The lower support 27 holds the lower region of the bar 40 fixed and translationally immovable in the frame 4.

The upper support 28 is attached to the vehicle structural element 30. The upper support 28 holds the upper region of the bar 42 fixed and immovable translationally in the chassis 4.

According to a first embodiment, the lower support 27 and the upper support 28 are embedded in the bar 24 and all degrees of freedom of the bar are locked relative to the vehicle structural element 30 and thus relative to the rest of the passenger compartment 4.

In this first embodiment, the lower support 27 and the upper support 28 form a pin of the hinge 20 and are adapted to keep the bar 24 immovable in relation to the vehicle structural element. The cover 22 is rotatable about the axis A-A relative to the bar 24 and thus relative to the vehicle structural element.

The upper support 28 then comprises a receiving region 48 adapted to receive the bar 24. The receiving region 48 is a threaded region.

The bar 24 comprises a threaded section 50 at the end of the upper region 42 opposite the central region 44. The bar 24 comprises a through opening 52, having an axis perpendicular to the longitudinal axis A-A, at the end of the lower region 40 opposite the central region 44. The end of the upper region 42 is threaded into the upper support 28. In particular, the threaded section 50 is screwed into the receiving region 48.

The lower support 27 comprises a connection element 54 attached to the vehicle structural element 30 and a removable assembly 56.

The removable assembly 56 comprises a centering pin 58 and a locking member 60.

The centering pin 58 is adapted to be inserted into the connection element 54. The centering pin 54 is adapted to center the bar 24 in the connection element 54. The centering pin 58 comprises, for example, a head 62 adapted to be inserted into a longitudinal hole of the bar 24 extending along the longitudinal axis A-A. The head 62 is, for example, cylindrical, and the outer diameter of the head 62 is, for example, substantially equal to the inner diameter of the longitudinal hole of the bar 24.

The locking member 60 comprises a removable portion 64 and at least one fastening means 66.

The locking member 60 is adapted to be attached to the connection element 54 and to block rotation of the bar 24 about the longitudinal axis A-A.

The locking member 60, when attached to the connection element 54, and the centering pin, when inserted into the connection element 54, hold the bar 24 stationary relative to the structural element 30.

The removable portion 64 is, for example, in the form of a tube segment and forms, together with the connection element 54, a tube accommodating the bar 24. The removable portion 64 has, for example, at least one receiving opening for each fastening means 66.

The fastening means 66 passes through the removable portion through its receiving opening and through the bar 24 by the through opening 52. In particular, the fastening means 66 is attached to the connection element 54 and secures the bar 24 and the removable portion 64 to the fastening element. Each fastening means 66 is, for example, a screw screwed into the connection element, clamping the removable portion 64 around the bar 24.

A second embodiment differs from the first embodiment only in the following. Analogous elements have the same references.

According to the second embodiment, the lower support 27 and the upper support 28 hold the bar stationary and immovable in translation while guiding the bar in rotation about its longitudinal axis A-A. The bar 24 can thus be rotatable about its longitudinal axis A-A relative to the structural element 30 and relative to the rest of the passenger compartment 4.

In this second embodiment, the lower support 27 and the upper support 28 form a pin of the hinge 20 and are adapted to keep the bar 24 translationally immovable in relation to the vehicle structural element 30, the cover 22 being rotationally immovable in relation to the bar 24, for example. The cover 22 and the bar 24 are then rotatable about the axis A-A relative to the lower support 27 and the upper support 28, for example, and thus relative to the structural element 30.

A method of mounting an assembly comprising a vehicle structural element 30 and a railway vehicle compartment 2 according to the invention will now be described. In particular, the method described hereinafter is the method of mounting an assembly comprising a vehicle structural element 30 according to the first embodiment in which the cover 22 is rotatable relative to the bar 24 about its longitudinal axis A-A.

In a first step, the bar 24 is attached to the cover. In particular, the bar is inserted through the cover so that the lower region 40 and the upper region 42 extend into the interior volume 16 and so that the central region 44 extends into the cavity 39. The cover 22 is, for example, mounted on bearings integral with the bar 24.

In a second step, the lower support 27 and the connection element 54 are attached to the vehicle structural element 30. For example, the lower support 27 and the connection element 54 are attached to the side wall 6 and the transverse wall 8.

In a third step, the bar equipped with the cover 22 is screwed into the upper support 28. In particular, the threaded section 50 is screwed into the receiving region 48.

In a fourth step, the centering pin 58 is inserted into the connection element 54. In particular, the centering pin 58 is inserted into the space formed between the connection element 54 and the bar 24 screwed into the upper support 28.

In a fifth step, the bar 24 is partially unscrewed from the upper support 28. The centering pin 58 then interacts with the connection element 54 and the bar 24 to center the bar 24 in the connection element 54. In particular, the bar 24 is centered by the centering pin 58 which is inserted into the connection element 54.

In a sixth step, the removable portion 64 is installed around the bar 24 and interacts with the connection element 54 to form a tube for receiving the bar 24. At least one fastening means is then attached to the connection element 54 through the portion receiving of the removable portion 64 and the through opening 52, thereby blocking rotation of the bar 24 about the longitudinal axis A-A, and similarly blocking translation of the bar 24 along the longitudinal axis A-A by preventing the screwing/unscrewing of the bar 24 in relation to the upper support 28.

The use of the cover 22 movable around the axis A-A of the bar 24, and more particularly of the compartment in which the bar forms the hinge pin is particularly advantageous since this allows a simplified and more economic compartment to be obtained.

The bar 24 of the cover 22, acting both as a hinge pin 23 and as a grip bar, is also particularly advantageous and makes it possible to simplify the compartment 2 even further. This simplified design also makes it possible to assemble and disassemble the compartment more quickly, facilitating maintenance operations.

The lower support 27 and the upper support 28 directly support the bar 24 and thus ensure improved rigidity of the bar 24 in relation to the passenger compartment 4.

The operation of so-called "first level" maintenance, i.e., visual inspection of equipment requiring frequent maintenance operations, such as a door opening mechanism 18. This type of maintenance operation is the most frequent type of operation, and is improved by such a railway vehicle compartment 2.

The operation of so-called "second level" maintenance, i.e., the replacement of parts of the door opening mechanism 18 is done by disassembling the cover 22. Second level maintenance operations are infrequent compared to first level maintenance operations and the rail vehicle compartment 2 according to the invention therefore simplifies maintenance operations taken as a whole.

The invention claimed is:

1. A compartment of a railway vehicle defining an interior volume and comprising:

a cover, movable between an open position, in which the cover is offset from the interior volume, and a closed position, in which the cover covers the interior volume and at least partially delimits said interior volume, a bar, a central region of the bar extending out of the interior volume, and a hinge defining the path of the cover between the open and closed positions, wherein, the cover is rotatable about an axis of the bar between the open position and the closed position of the cover, the bar forming a pin of the hinge, and wherein an upper region and a lower region of the bar extend into the interior volume, the bar passing through the cover between the lower region of the bar and the central region of the bar, and between the upper region of the bar and the central region of the bar.

2. The compartment of a railway vehicle according to claim 1, wherein the bar is a grip bar for grasping by a passenger and supporting the weight of a rail vehicle user.

3. The compartment of a railway vehicle according to claim 1, wherein the central region extends into a cavity of the cover and is offset from a cavity wall of the cover by at least 40 mm.

4. The compartment of a railway vehicle according to claim 1, wherein an electrical equipment of the rail vehicle is arranged at least partially in the interior space.

5. The compartment of a railway vehicle according to claim 4, wherein the electrical equipment of the rail vehicle is a door opening mechanism.

6. An assembly comprising:

a vehicle structural element, and a compartment of a rail vehicle according to claim 1, the compartment comprising a lower support holding a lower end of the bar in relation to the structural element of the vehicle and an upper support holding an upper end of the bar in relation to the structural element of the vehicle, the hinge comprising a wing, the cover and the wing being integral.

7. The assembly according to claim 6, wherein the lower support and the upper support form a knuckle of the hinge and are adapted to hold the bar stationary relative to the vehicle structural element and wherein the cover is rotatable relative to the bar.

8. The assembly according to claim 7, wherein the upper end of the bar is threaded into the upper support, the lower support comprising:

a connection element attached to the structural element of the vehicle; and a removable assembly, comprising:

a centering pin, adapted to be inserted into the connection element and to center the bar in the connection element, and a locking member, adapted to be attached to the connection element and to block rotation of the bar about the axis, the bar being held stationary relative to the structural element when the centering pin is inserted and the blocking member is attached.

9. A method of mounting an assembly according to claim 8, comprising:

attaching the bar to the cover;

attaching the connection element and the upper support to the structural element; and screwing the bar equipped with the cover to the upper support;

inserting the centering pin into the connection element;

partially unscrewing the bar from the upper support, the centering pin interacting with the connection element to center the bar in the connection element; and attaching the locking member to the connection element to block rotation of the bar about the axis.

10. A railway vehicle comprising an assembly according to claim 6.

* * * * *